Figure 1:
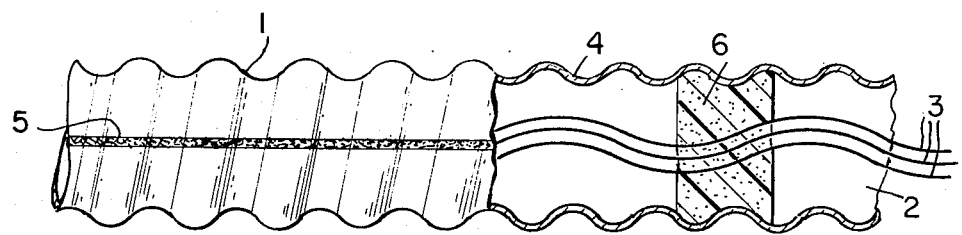

United States Patent [19]

Rohner et al.

[11] 4,232,935
[45] Nov. 11, 1980

[54] COMMUNICATIONS CABLE WITH OPTICAL WAVEGUIDES

[75] Inventors: Peter Rohner, Isernhagen; Michael Still, Langenhagen, both of Fed. Rep. of Germany

[73] Assignee: Kabel- und Metallwerke Gutehoffnungshuette AG, Fed. Rep. of Germany

[21] Appl. No.: 936,179

[22] Filed: Aug. 23, 1978

[30] Foreign Application Priority Data

Sep. 26, 1977 [DE] Fed. Rep. of Germany ....... 2743260

[51] Int. Cl.$^3$ .............................................. G02B 5/16
[52] U.S. Cl. ................... 350/96.23; 29/825; 174/102 D; 174/106 D
[58] Field of Search .......... 350/96.23, 96.26; 29/429, 825; 174/102 D, 106 D, 107

[56] References Cited

U.S. PATENT DOCUMENTS

| 3,357,423 | 12/1967 | Winchester et al. | 350/96.26 |
| 3,955,878 | 5/1976 | Nowak | 350/96.23 |
| 4,039,248 | 8/1977 | Franke et al. | 350/96.23 |

FOREIGN PATENT DOCUMENTS

| 2434280 | 2/1976 | Fed. Rep. of Germany | 350/96.23 |
| 2507648 | 9/1976 | Fed. Rep. of Germany | 350/96.23 |
| 2507649 | 9/1976 | Fed. Rep. of Germany | 350/96.23 |
| 1445732 | 8/1976 | United Kingdom | 350/96.23 |

OTHER PUBLICATIONS

G. Bahder et al. "Experience to date with optical fiber cables", *Tech. Paper, General Cable Corp.*, pp. 380–384, Feb. 1978.

*Primary Examiner*—Stewart J. Levy
*Attorney, Agent, or Firm*—James C. Jangarathis

[57] ABSTRACT

A communications cable in which optical waveguides partially fill the inner cross section of a corrugated metallic tubular member and form therein an undulatory configuration extending in the axial direction; thus providing for any given section of cable a length associated with the optical waveguides that is greater than the length of the corresponding section of the tubular member of such section of communications cable.

3 Claims, 3 Drawing Figures

COMMUNICATIONS CABLE WITH OPTICAL WAVEGUIDES

The optical waveguides in the sense of the invention are finished structures of glass fiber capable of conducting light waves without additional processing. Such optical waveguides are useful as a substitute for the hitherto customary metal conductors. They have a number of advantages over metal conductors. Optical waveguides can accommodate broad frequency bands with minimal attenuation, such that more channels with improved amplification discrimination are feasible. They are highly flexible and have small cross sections, thus permitting small diameter cable constructions. Furthermore, they are unaffected by ambient electric and magnetic fields. The raw material for the manufacture of optical waveguides is inexpensive and is in plentiful supply throughout the world.

For optical waveguides to be used as conductors in general communications applications, the same must be inserted into cables. In this connection, care must be taken to prevent damage to the optical waveguides both during the manufacture of the cable and in its transportation and installation. Such is the case since the optical waveguides are generally highly brittle and evidence minimal elasticity.

A communications cable of the type defined above is described in German published patent application DE-OS No. 25 19 684. The optical waveguides included in such cable are separated from each other and wrapped in foil, which is tightly enclosed in a corrugated metallic tubular member. Such optical waveguides evidence a sag between two support points, such that when the metal jacket is under stress, by bending under mechanical shock, for example, strains without breaks may occur. The corrugated metallic tubular member provides a flexible and mechanically stable enclosure for the optical waveguides, but the technique of placing the optical waveguides in the tubular member requires expensive multiple manufacturing procedures.

The instant invention provides a method of fabricating optical waveguides within a communications cable by a single manufacturing procedure with the use of conventional cable-making machines. In accordance with the present invention, there is provided a cable in which the optical waveguides are positioned in any predetermined or random special arrangement within the metallic tubular member, only partially filling the inner cross section of the tubular member, and each extending in a longitudinally undulatory path to permit a specific possibility of elongation of the optical waveguide. The advantage of this communications cable is that no preliminary operation relative to the optical waveguides is required to position the optical waveguides within the tubular member.

Advantages provided by the invention will become evident from the following description. The optical waveguides may be positioned adjacent to each other or statistically distributed throughout the tubular member's inner cross section. The space within the tubular member not occupied by the optical waveguides may be continuously or discontinuously impregnated with a filler material for, inter alia, cable waterproofing. Electrical conductors may be introduced into the tubular member for the purpose of transmitting power. Furthermore, elements of high tensile strength may be added to the cable structure in the form of wires extending within the tubular member.

Figure 2:
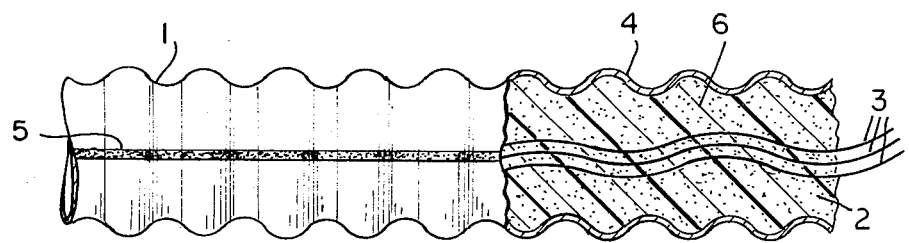
Figure 3:
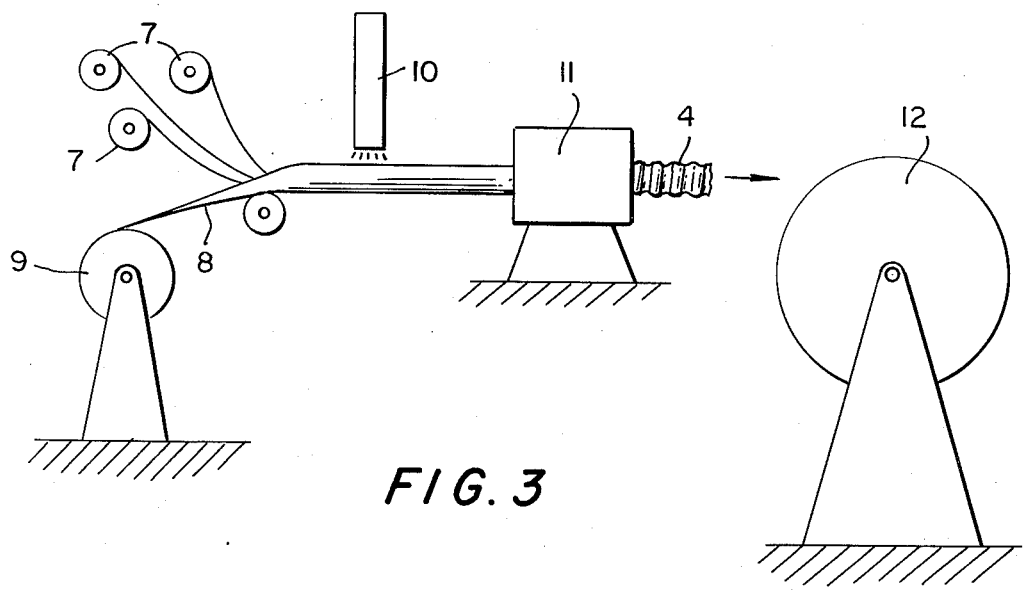

The invention will be further described with respect to the accompanying drawings, wherein:

FIGS. 1 and 2 are partial cross sectional views of a communications cable according to the invention, and FIG. 3 is a schematic representation of a device for the manufacture of such a cable.

Referring now to the drawings, the core 2 of a communications cable 1 includes a plurality of optical waveguides 3. For the sake of simplicity, only three such optical waveguides are shown in FIGS. 1-3. A corrugated tubular member 4, which has a longitudinal welded seam 5, serves as outer mechanical protection for the cable core 2. Additional layers consisting of synthetic material and which may also contain materials of high tensile strength may be used as desired to cover the tubular member 4. The tubular member 4 may have transverse helical (FIG. 1) or annular (FIG. 2) corrugations.

Since the optical waveguides 3 only partially fill the inner cross section of the tubular member 4, it is necessary to stabilize them inside the member 4, at least at longitudinal intervals. A filler material 6 may be used for this purpose, by filling the complete cross section of the tubular member 4, either continuously, as illustrated in FIG. 2, or discontinuously, as illustrated in FIG. 1. Any of the various materials known in cable technology can be used as the filler material. For example, a foamy plastic material or a powder can be used. Other applicable substances are petrolata, which have a thick consistency at room temperature and become more fluid at higher temperatures. Such petrolata are vaseline-like and consist essentially of waxes and oil. One can also insert fillers of high molecular polymers, plastic material or material based on bitumen or polybutene.

The corrugated tubular member 4, comprised of copper or aluminum, can be used as a conductor in a power supply system for amplifier units. It is also possible to make the tubular member of steel or some other suitable metal especially when two conductors required for the power supply are available inside the cable core.

The optical waveguides 3 are formed in an undulatory configuration within the tubular member 4 as illustrated in FIGS. 1 and 2. As a result thereof, the optical waveguides are greater in length than the tubular metal member 4, and can thus be extended to the stresses of the cable within certain limits, thus avoiding damage. The optical waveguides 3 can be placed in the tubular member 4 in accordance with a statistical distribution, or a particular special arrangement relative to one another, and several waveguides may be tied to each other to form a group. For the purpose of differentiating individual waveguides, which is especially necessary when they are placed in the cable cross section in no particular order, they can be bound individually or in groups, in covers that can be distinguished. These distinctions can be made by color-coding the covers or by applying rings to these covers.

When the complete remaining cross section inside the tubular member 4 is occupied by the filler 6, as illustrated in FIG. 2, a material can be used to waterproof the length of the cable so that any water penetrating the cable core through a fault in the member 4 cannot propogate axially. This waterproofing can be accomplished by choosing the filler material such that it will swell when in contact with water. It can also be done by coating the outside of the filler material 6 with a thin layer of the type of material that swells in contact with water.

For further protection of the cable core 2, an insulating foil such as synthetic material or paper may be used to cover the cable core before the tubular member 4 is placed over the cable core 2—crepe paper is especially good for this purpose—and thus also keep the space between the cable core and the tubular member 4 waterproof.

The following is a preferred procedure for the manufacture of a communications cable according to the invention:

The desired number of optical waveguides, only three of which are shown in FIG. 3, is taken from a corresponding number of reels 7. The optical waveguides are introduced into the tubular member 4 before the latter is manufactured. The tubular member is itself made from a metal strip 8 obtained from a drum 9. A tubular member 4 with a longitudinally extending seam 5 is formed from the strip 8 by a known roller system which is shown in a schematic manner. Before the seam in the tube is closed, the optical waveguides 3 and also the filler material 6 are inserted. The seam 5 of the tube is continuously sealed by means of a welding machine 10, while the tubular member is transversely corrugated by the corrugator 11. The finished cable is then wound on a drum 12.

Since the optical waveguides 3 in the finished cable are to extend in an undulatory configuration, the waveguides are drawn into the fabricating line at a faster rate than the metal strip 8. Associated with the reels 7 is a speed control device (not shown) for the purpose of driving optical waveguides 3 faster than the metal band 8 is drawn through the fabrication line. The optical waveguides 3 are also moved back and forth transverse to the direction of movement of the cable by mobile guides (not shown) so that the waveguides form an undulatory configuration within the tubular member 4. The motion of the guides may be made uniform, or irregularly in accordance with statistical values.

Along with the optical waveguides 3, which are "pushed" into the cable core faster than the metal strip 8 is withdrawn from the drum 9, the filler material 6 is introduced continuously or discontinuously before the metal strip 8 is closed. Also, a layer of insulating material may, if desired, be used to cover the core 2 before the metal jacket is closed. If high tensile strength elements and electrical conductors are brought into the cable core 2, they must also be introduced into the tubular member 4 before the latter is closed.

Numerous modifications and variations of the present invention are possible in light of the above teachings and, therefore, within the scope of the appended claims the invention may be practised otherwise than as particularly described.

We claim:

1. A flexible optical signal transmitting cable comprising:
    a plurality of elongated, wave shaped, optical fibers extending in an axial direction;
    a transversely corrugated, longitudinally seam welded, metallic tubular member formed about but spacially separated from said plurality of optical fibers which only partially fill the inner cross-section of said metallic tubular member;
    water resistant support means that fill the unoccupied remaining portions of the complete interior cross-section of said metallic tubular member along at least longitudinal intervals of said metallic tubular member, said water resistant support means preventing axial propogation of any water penetrating the interior of said metallic tubular member and providing direct, non rigid, radial support of each of said optical fibers within each of said longitudinal intervals of said tubular member for permitting unilinear axial unfolding thereof upon tensional forces being applied thereto, said optical fibers having been continuously formed by feeding same in a longitudinal path while simultaneously shaping a metal strip about said optical fibers into a tubular member, injecting a water resistant filler material at a first point along said longitudinal path prior to the closing of the opposite longitudinal edges of said metal strip, and welding said longitudinal edges and corrugating the welded tubular member downstream of said first point; and
    a tubular, flexible jacket of insulating material positioned about said corrugated metallic tubular member, including elements of high tensile strength for limiting the axial expansion of said corrugated metallic tubular member.

2. An optical transmitting cable in accordance with claim 1, wherein said water resistant support means fills the unoccupied remaining portions of the complete interior cross-section of said metallic tubular member throughout the axial length of said member.

3. An optical signal transmitting cable in accordance with claim 1, wherein said metallic tubular member is annularly corrugated into said water resistant material.

* * * * *